No. 691,439. Patented Jan. 21, 1902.
W. B. CAMPBELL.
FEED DISTRIBUTER.
(Application filed Oct. 12, 1900.)
(No Model.)
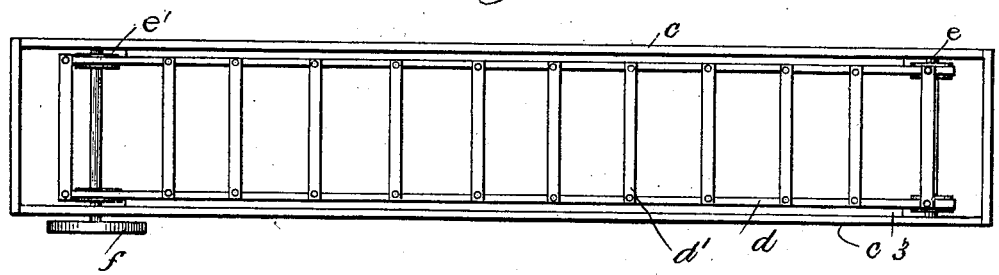
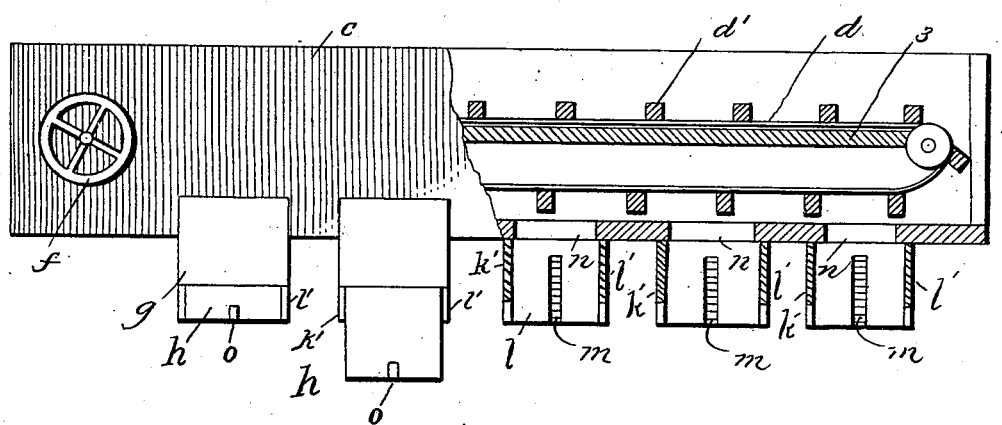
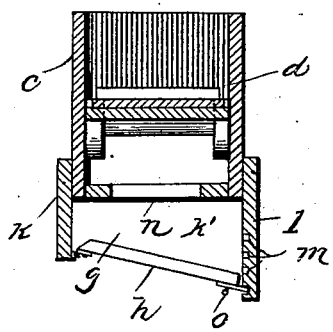
Witnesses
E. N. Ryan.
H. Chandler.
Inventor
W. B. Campbell.
by Chandler & Chandler
Attorneys
THE NORRIS PETERS CO., PHOTO-LITHO., WASHINGTON, D. C.

UNITED STATES PATENT OFFICE.

WILLIAM B. CAMPBELL, OF CAMPBELL-CROFT, CANADA.

FEED-DISTRIBUTER.

SPECIFICATION forming part of Letters Patent No. 691,439, dated January 21, 1902.

Application filed October 12, 1900. Serial No. 32,837. (No model.)

*To all whom it may concern:*

Be it known that I, WILLIAM B. CAMPBELL, a subject of the Queen of England, residing at Campbell-Croft, in the Province of Ontario, Dominion of Canada, have invented certain new and useful Improvements in Feed-Distributers; and I do hereby declare the following to be a full, clear, and exact description of the invention, such as will enable others skilled in the art to which it appertains to make and use the same.

My invention relates to a new and improved system for conveying ensilage and cut feed of all descriptions to cattle and other stock when placed in line or in stanchions, by means of which each animal or pair of animals can be rapidly and almost instantaneously fed, with a marked saving both in time and labor, and consequently in cost.

In the drawings like characters of reference designate similar parts throughout the several views.

Figure 1 represents a plan of my invention. Fig. 2 is an elevation of the same, partly in section. Fig. 3 is a transverse section through the apparatus.

Referring now to the drawings, my invention comprises a rectangular casing $c$, comprising sides, ends, and a bottom, the latter being provided with a number of transverse openings $n$. Mounted at the ends of the casing $c$ are pulleys $e$ and $e'$, encircling which is an endless conveyer $d$. This conveyer is of the usual style and may be formed of an endless belt of canvas, having cross-piece $d'$ secured thereto to form pockets. Extending longitudinally of the casing $c$ and secured between the pulleys $e$ and $e'$ is a partition 3 to support the portion of the conveyer which lies above the pulleys, as shown in Fig. 2. The axle of the pulley $e'$ extends through the casing at one of its sides, and to the protruding end is secured a pulley $f$, which may be operated by any suitable power, such as wind, steam, or horse power. Secured to the base of the casing $c$ and directly below the openings therein are a number of hoppers $g$, each being provided with a hinged bottom $h$. The hoppers $g$ are also rectangular in form and comprise vertical sides $k$ and $k'$ and $l$ and $l'$. The sides $l$ are slightly longer than the sides $k$, and the lower edges of the other sides are beveled to connect the two. The bottoms $h$ of the hoppers are hinged to the sides $k$, and upon the inner face of the sides $l$ are a number of notches $m$ to receive the catches $o$, secured to the bottom.

The apparatus above described is placed above the troughs in which the animals are to be fed, there being a trough to correspond to each of the hoppers. When this has been done, the feed is put into the top portion of the casing upon the conveyer, and as the latter is moved upon the pulleys the feed is distributed into the hoppers through the openings $n$. The bottom $h$ may then be opened to allow the feed to fall into the troughs.

Owing to the notches $m$ and the catches $o$ the capacity of the hoppers may be regulated by adjusting the bottoms vertically.

Having now fully described and shown my invention, what I claim, and desire to secure by Letters Patent, is—

A device for feeding cattle comprising a casing, pulleys mounted transversely of the casing, an endless conveyer encircling the pulleys, openings in the base of the casing, hoppers secured to the base of the casing, beneath the openings, means for rotating the conveyer, a number of notches on one side of each hopper, a bottom hinged to each hopper and a catch secured to each bottom to operate in connection with the notches for varying the capacity of the hoppers.

In testimony whereof I hereunto sign my name, in the presence of two subscribing witnesses, on this 13th day of June, 1900.

WILLIAM B. CAMPBELL.

Witnesses:
JOHN H. ROSEMAN,
WILLIAM DAVISON.